(12) United States Patent
Near

(10) Patent No.: US 7,337,183 B2
(45) Date of Patent: Feb. 26, 2008

(54) CUSTOMER EXTRANET PORTAL

(75) Inventor: Lee A. Near, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 829 days.

(21) Appl. No.: 10/299,298

(22) Filed: Nov. 19, 2002

(65) Prior Publication Data

US 2004/0111325 A1 Jun. 10, 2004

(51) Int. Cl.
*G06F 17/30* (2006.01)
(52) U.S. Cl. .................... 707/102; 707/10; 707/103 X; 707/104.1; 702/183; 700/22
(58) Field of Classification Search ............. 707/1–10, 707/100–104.1, 200–206; 376/260; 700/291, 700/22, 274, 275, 286, 287, 295; 703/18; 706/20; 702/179, 180, 181, 182, 183, 184
See application file for complete search history.

(56) References Cited

U.S. PATENT DOCUMENTS 5,333,240 A * 7/1994 Matsumoto et al. .......... 706/20
6,681,156 B1 * 1/2004 Weiss ......................... 700/291
6,768,998 B2 * 7/2004 Leonard et al. ............. 707/102
7,039,575 B2 * 5/2006 Juneau ......................... 703/18
7,058,154 B1 * 6/2006 Stark et al. ................. 376/260

OTHER PUBLICATIONS

Roby C. Lentz, et al., a student design project to improve power quality for a commercial facility, IEEE, Feb. 1995, 3-10.*
Z. Ao, a transient stability simulation package (TSSP) fot teaching and research purposes, IEEE, Feb. 1995, 3-17.*
SmartSignal Website (home page: www.smartsignal.com/index.asp), 4 pages downloaded from the Internet on Sep. 23, 2002.
Strategic Power Systems, Inc. Website (home page: www.spsinc.com/choice.html), three pages downloaded from the Internet on Sep. 23, 2002.

* cited by examiner

*Primary Examiner*—Jean Bolte Fleurantin

(57) ABSTRACT

According to one embodiment of the invention, a computerized method of providing information to a customer in the power industry includes automatically receiving data representing a plurality of characteristics of a power plant device associated with a power plant of the customer based on monitoring of the power plant device, in which the data is received at a location remote from the power plant, processing the data, generating one or more outputs representative of the processed data, displaying, by a web page of a website, at least one of the outputs in response to a request by the customer, and displaying, by the web page, diagnostic information related to the displayed output.

20 Claims, 10 Drawing Sheets

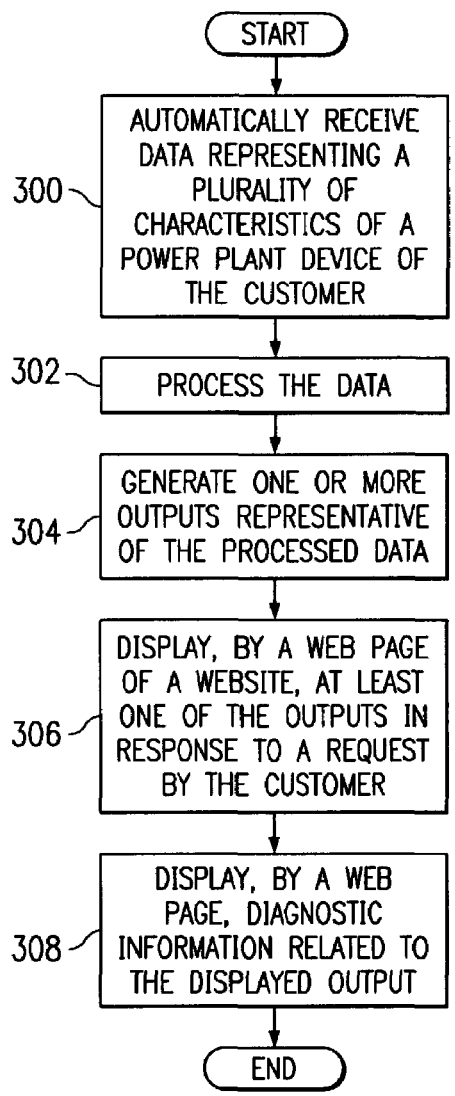
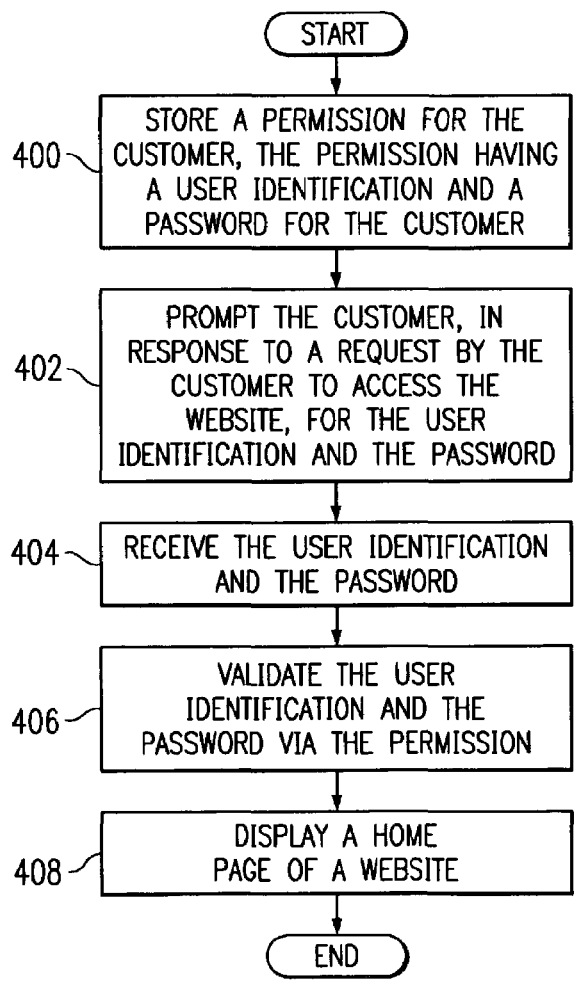

United States Patent US 7,337,183 B2

CUSTOMER EXTRANET PORTAL

TECHNICAL FIELD OF THE INVENTION

The present invention relates generally to the field of business-to-business (B2B) relationships and, more particularly, to a customer extranet portal.

BACKGROUND OF THE INVENTION

For suppliers to survive in the business world, they must keep their customers happy. Happy customers are repeat customers and also lead to new customers. One obvious way to keep customers happy is to provide good quality products. However, this is not enough in today's competitive business environment. Customers demand good service. A key element in providing good service is to communicate effectively with customers.

Today's digital economy helps communication between suppliers and customers immensely. The Internet especially facilitates this effective communication between suppliers and customers. A concept referred to as B2B ("business to business") leverages the Internet to gain a closer alignment with customers to ensure a good, solid relationship with customers, which helps the bottom line and gives a supplier a competitive advantage in the marketplace. If the supplier can help their customers become more profitable, then the customers will ensure that the suppliers are also profitable.

The power industry is one industry that has not fully embraced B2B. One reason may be because suppliers in the power industry sell customers very large and expensive devices. These devices typically have a very long lifecycle, which means customers do not purchase these devices on a daily basis.

SUMMARY OF THE INVENTION

According to one embodiment of the invention, a computerized method of providing information to a customer in the power industry includes automatically receiving data representing a plurality of characteristics of a power plant device associated with a power plant of the customer based on monitoring of the power plant device, in which the data is received at a location remote from the power plant, processing the data, generating one or more outputs representative of the processed data, displaying, by a web page of a website, at least one of the outputs in response to a request by the customer, and displaying, by the web page, diagnostic information related to the displayed output.

According to another embodiment of the invention, a website includes a login web page querying a customer for a user identification and a password and a home page displaying a plurality of links on the homepage. The plurality of links includes a site statistics link operable to display, in response to a selection of the site statistics link by the customer, a plurality of outputs as links on a site statistics web page, some of the outputs representative of a plurality of operating characteristics of a power plant device of the customer and some of the outputs representative of diagnostic information that is related to the operating characteristics of the power plant device.

Embodiments of the invention provide a number of technical advantages. Embodiments of the invention may include all, some, or none of these advantages. In one embodiment, customers may obtain statistical reports on their operating plants and equipment associated with their operating plants via a customer extranet portal that assures secure communication. Customers may also obtain information on future outage activities for their operating plants, relevant technical advisories and service bulletins. On-line product manuals, part lists, and the ability to order and track parts may also be available to a customer. In some embodiments, customers may participate in on-line seminars, video conferences and relevant news groups. A customer extranet portal may also be used for marketing and/or advertising purposes. An important advantage for a supplier hosting such a customer extranet portal is the improved customer relationships resulting from the efficient relay of relevant information to customers as well as the value-added engineering that the supplier provides.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which:

FIG. 3 is a flowchart illustrating a method for providing information to a customer in the power industry according to one embodiment of the present invention;

FIG. 4 is a flowchart illustrating a method for allowing a customer in the power industry access to a home page of a website according to one embodiment of the present invention;

DETAILED DESCRIPTION OF EXAMPLE EMBODIMENTS OF THE INVENTION

Example embodiments of the present invention and their advantages are best understood by referring now to FIGS. 1 through 12 of the drawings, in which like numerals refer to like parts.

Figure 1:
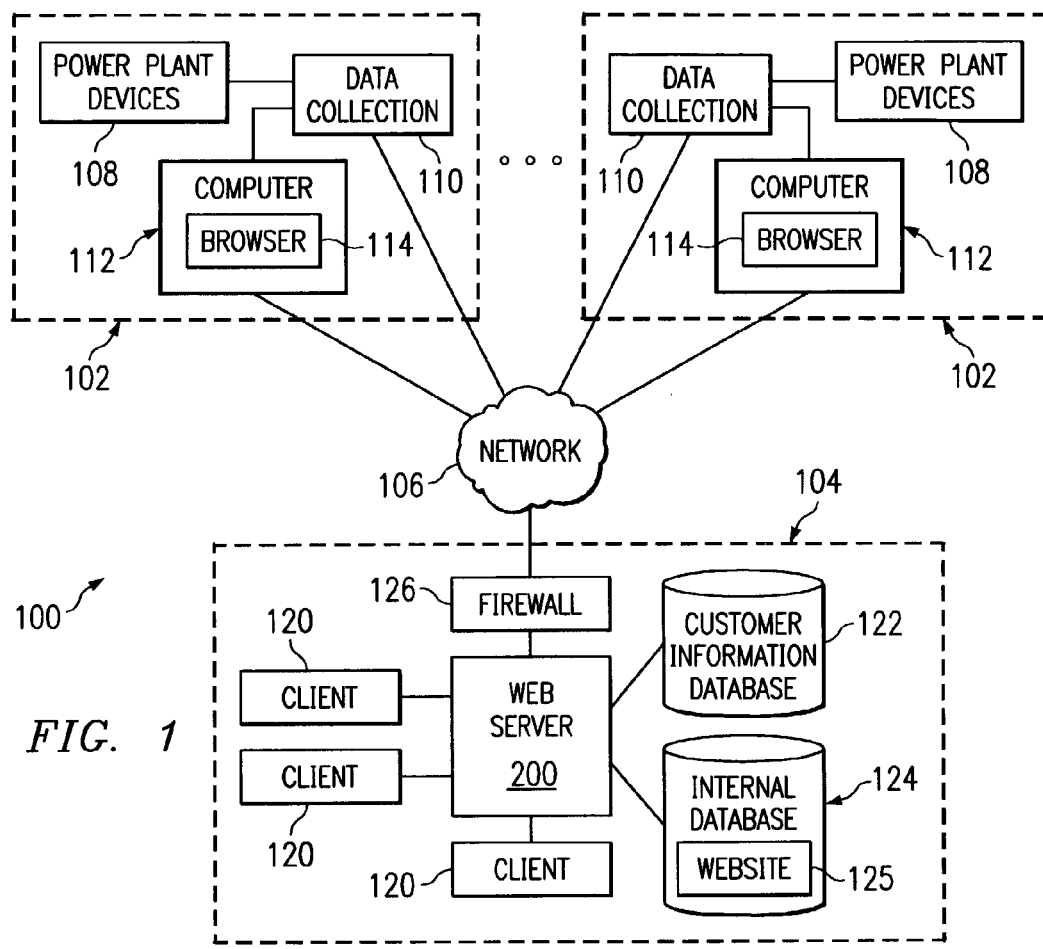
FIG. 1 is a block diagram of a system for providing information to a customer in the power industry according to one embodiment of the present invention.

FIG. 1 is a block diagram of a system 100 for providing information to a customer 102 in the power industry according to one embodiment of the present invention. System 100 includes a plurality of customers 102 able to receive information from a supplier 104 via a network 106. According to the teachings of one embodiment of the present invention, customers 102 receive information from supplier 104 via a website 125 that assures secure communication. The functionality and elements of website 125 are described in further detail below in conjunction with FIGS. 5-12. Generally, customers 102 may obtain information from supplier 104 relating to their operating plants and equipment associated with their operating plants. In addition, such things as future outage activities, technical advisories, service bulletins, product manuals, part lists, and the ability to order and track parts are just a few examples of the type of information that may be accessible by customers 102. Supplier 104 benefits from system 100 by supplying this information, which improves their relationship with customers 102.

Customers 102 do business in the power industry. Accordingly, a particular customer 102 has one or more power plant devices 108 that generate power for their customers. Power plant devices 108 may include any suitable device that is used in a power plant, such as a turbine, a compressor, a generator, a boiler, a pump, a valve, a bearing, or any other suitable device. To ensure that power plant devices 108 operate correctly and in an efficient manner, they must be monitored. A data collection 110 facilitates this monitoring. Data collection 110 includes any suitable data collection devices, such as sensors, that are operable to sense a characteristic of a particular power plant device 108. For example, data collection 110 may sense characteristics, such as pressure, temperature, time, position, speed, quality, vibration, current output, and any other suitable characteristic that is desired to be monitored.

In one embodiment, the data collected may be fed to a computer 112 of customer 102 that is operable to store the data for later use. As described in further detail below, the data collected may also be automatically sent, either through computer 112 or other suitable manner, to supplier 104 for processing. Computer 112 may comprise any suitable general purpose or specialized computer system. In the illustrated embodiment, computer 112 includes a web browser 114. Web browser 114 is any suitable browser software, such as Netscape or Internet Explorer, that utilizes hypertext transfer protocol ("HTTP"), file transfer protocol ("FTP"), or any other suitable protocol that allows a user to access a website of supplier 104. Computer 112 may have any suitable functionality.

Supplier 104 supplies power plant devices 108 to customers 102. Accordingly, to ensure that customer 102 is happy, supplier 104 not only needs to supply quality power plant devices 108 but also needs to provide quality service. This is one reason why it is important for supplier 104 to communicate effectively with customer 102. One way to provide good service to customers 102 is to take an interest in the operation of the power plant devices 108 supplied to customer 102. This effective communication may be facilitated with customer 102 over network 106 via website 125.

In the illustrated embodiment, supplier 104 includes a web server 200, a plurality of clients 120, a customer information database 122, an internal database 124 storing website 125, and a firewall 126. Supplier 104 may have more, less, or different elements, and the elements associated with supplier 104 may be in one location or spread out over multiple locations.

Web server 200, which is described in greater detail below in conjunction with FIG. 2, generally functions to control the processing of data and flow of information between customer 102 and supplier 104. Although only one web server 200 is shown in FIG. 1, the functionality performed by web server 200 may be spread across multiple web servers 200.

Clients 120 are any suitable computing devices coupled to web server 200 in any suitable manner, such as a local area network, a wide area network, or any other suitable private network associated with supplier 104. Clients 120 may function to send information to web server 200 so that the information may be available to customer 102 when requested.

Customer information database 122 and internal database 124 may comprise files, stacks, databases, or other suitable organizations of volatile or non-volatile memory. Customer information database 122 and internal database 124 may be random access memory, read-only memory, CD-ROM, removable memory devices, or any other suitable devices that allow storage and/or retrieval of data. Customer information database 122 and internal database 124 are interchangeable and may perform the same functions. The functionality of each of databases 122 and 124 are described in detail below in conjunction with FIG. 2. Generally, customer information database 122 stores information about a respective customer 102 and that customer's 102 power plant devices 108. Internal database 124 stores website 125 that contains information desired by customer 102.

Firewall 126 is any suitable combination of hardware, firmware, and/or software that functions primarily for security purposes to limit network access from one side of firewall 126 to the other side. A lot of the information that supplier 104 stores for its customers 102 is sensitive information and must be protected from third parties. Hence, firewall 126 performs these security functions.

In one embodiment, network 106 comprises an Internet protocol (IP) based data communications network operable to support communication between customers 102 and supplier 104. In the illustrated embodiment, network 106 comprises the Internet and is operable to support communication between customers 102 and supplier 104 using the hypertext transport protocol secure ("https"), which is a type of server software that provides the ability for secure transactions to take place over network 106. Alternatively, network 106 may comprise any suitable wireline or wireless based data communications network, such as asynchronous transfer mode, Ethernet, fiber distributed data interface, frame relay, SONET, wireless application protocol networks and other suitable local area networks, metropolitan area networks, and wide area networks. In general, network 106 comprises any suitable global computer network.

Figure 2:
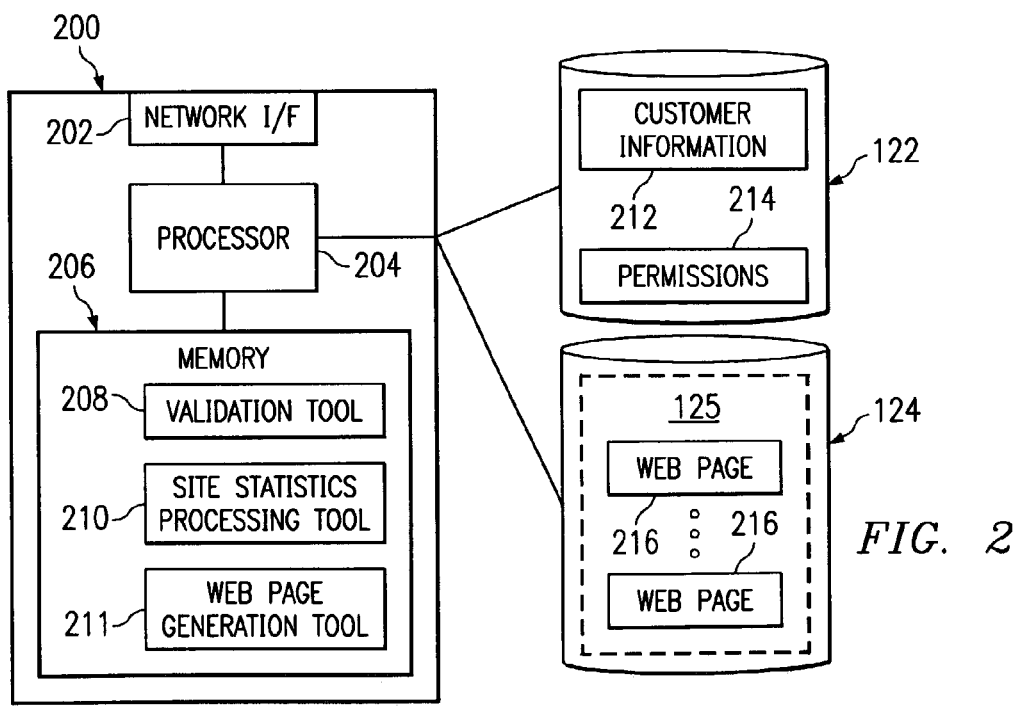
FIG. 2 is a block diagram of a web server for use in hosting a website in accordance with one embodiment of the present invention.

FIG. 2 is a block diagram of web server 200 in accordance with one embodiment of the present invention. In the illustrated embodiment, web server 200 includes a network interface 202, a processor 204, and a memory 206 storing validation tool 208, sites statistics processing tool 210, and web page generation tool 211. Web server 200 is also coupled to customer information database 122 and internal database 124.

Network interface 202 is any suitable device operable to control the flow of information between web server, 200 and network 106. In one embodiment, network interface 202 is a network interface card; however, network interface 202 may be other suitable devices for transmitting and receiving signals, such as a modem.

Processor 204 is any suitable type of processing unit that executes logic. One of the functions of processor 204 is to control the storing of information received from either customers 102 or clients 120. Processor 204 may also control the retrieving of validation tool 208, site statistics processing tool 210, and web page generation tool 211 from memory 206 and to execute those applications at the appropriate time. Processor 204 may have other suitable functions.

Memory 206 may comprise files, stacks, databases or other suitable organizations of volatile or non-volatile memory. Memory 206 may be random access memory, read-only memory, CD-ROM, removable memory devices, or any other suitable devices that allow storage and/or retrieval of data. One of the functions of memory 206 is to store validation tool 208, site statistics processing tool 210, web page generation tool 211 or other suitable tools.

Validation tool 208 is a computer program written in any suitable computer language that is operable, in one embodiment, to validate a user identification and a password input by a customer 102 when customer 102 is trying to access website 125 of supplier 104. Details of validation tool 208 are described below in connection with FIG. 4.

Site statistics processing tool 210 is a computer program written in any suitable computer language that is operable, in one embodiment, to process received data representing characteristics of power plant devices 108 of customer 102 and to generate outputs representative of this processed data. Details of site statistics processing tool 210 are described below in conjunction with FIG. 3.

Web page generation tool 211 is a computer program written in any suitable computer language that is operable, in one embodiment, to generate one or more web pages 216 of website 125. Examples of web pages 216 generated by web page generation tool 211 are illustrated in FIGS. 5 through 12.

In the illustrated environment, validation tool 208, site statistics processing tool 210, and web page generation tool 211 are logic encoded in memory 206. However, in alternative embodiments, validation tool 208, site statistics processing tool 210, and web page generation tool 211 may be implemented through application specific integrated circuits ("ASICs"), field programmable gate arrays ("FPGAs"), digital signal processors ("DSPs"), or other suitable specific or general purpose processors.

Customer information database 122 stores, among other things, customer information 212 and permissions 214. Customer information 212 represents any suitable information related to a particular customer 102. For example, customer information 212 may include such things as the name of customer 102, the number of plants customer 102 owns, the locations of those plants, the types of power plant devices 108 that customer 102 possesses, the type of information that customer 102 typically desires, or other suitable customer information.

Permissions 214 are typically granted by a system administrator of supplier 104 to respective customers 102. Permissions 214 are stored in customer information database 122 and have associated user identification and passwords that are unique to respective customers 102. Permissions 214 are checked when customer 102 tries to access website 125. Permissions 214 may also allow different types of rights, such as permitting some customers 102 to access particular information while denying access to other customers 102.

Internal database 124 stores, among other things, website 125 having a plurality of web pages 216. Web pages 216, which may be generated by web page generation tool 211, may include one or more hypertext mark-up language ("HTML") and/or extensible mark-up language ("XML") based web pages that provide various information to customers 102 when requested. Other suitable languages and environments may also be used to provide web pages 216, such as Active Server Pages ("ASPs"), Common Gateway Interface ("CGI") scripts, Java, Javascript, ActiveX, and wireless mark-up language ("WML"). Web pages 216 may include text, graphics, sound, video, or other suitable types of data. Example web pages 216 are illustrated in FIGS. 5 through 12.

FIG. 3 is a flowchart illustrating a method for providing information to a customer in the power industry according to one embodiment of the present invention. The method outlined in FIG. 3 shows some of the functionality of site statistics processing tool 210. The illustrated method begins at step 300 where data representing a plurality of characteristics of power plant devices 108 of customer 102 is automatically received. The characteristics may include such things as pressure, temperature, time, position, speed, quality, vibration, current output, or other suitable characteristics of a particular power plant device 108. Power plant device 108 may include such things as a turbine, a compressor, a generator, a boiler, a pump, a valve, a bearing, or other suitable device utilized in power plant customer 102.

Web server 200 of supplier 104 automatically receives this data from customer 102 over network 106 either directly from data collection 110 or from computer 112 of customer 102. Processor 204 of web server 200 facilitates the storing of this information in its appropriate location, such as customer information database 122.

Processor 204 also retrieves site statistics processing tool 210 from memory 206 and processes the stored data, as denoted by step 302. The processing may include any suitable type of processing that manipulates the data into a usable format. In some embodiments, the processing of the stored data may be done manually and sent to web server 200 by a user of client 120 of supplier 104. In any event, one or more outputs representative of the processed data is generated at step 304. These one or more outputs may be such things as a chart, a graph, a list, a table, or any combination thereof that is indicative of an operation of a particular power plant device 108 of customer 102. These outputs may be stored as web pages 216 in internal database 124 or may be stored as other suitable files in any suitable location.

At least one of the outputs generated at step 304 is displayed by a particular web page 216 of website 125 in response to a request by a particular customer 102, as denoted by step 306. For example, customer 102 may desire to see information about a particular turbine in their power plant. The desired output representing one or more characteristics of this turbine would be displayed as a link on a site statistics web page 800 (FIG. 8) of website 125. Customer 102 would then select the desired link and the appropriate web page 216 (in this example, site statistics web page 800) would then be retrieved from internal database 124 and transferred to computer 112 of customer 102 so that customer 102 may see the requested information.

Diagnostic information related to the displayed outputs may also be displayed by web page 216 of website 125, as denoted by step 308. This diagnostic information is value added engineering information provided by supplier 104 to customer 102 by analyzing the processed data. Since supplier 104 is typically the original equipment manufacturer ("OEM"), then supplier 104 is in a better position to analyze and make sense out of the processed data. This information may be relayed to customer 102 via web page 216 as diagnostic information. For example, this may include information regarding power plant devices possessed by other customers that are of the same or similar type as those possessed by customer 102 for comparison purposes. In other words, customer 102 may be able to see how the efficiency of a specific combustion turbine of theirs stacks up against an average efficiency of a fleet of the same type of combustion turbine. Any suitable diagnostic information is contemplated by the present invention, such as historical information related to power plant device 108 of customer 102 or projected information regarding the future operation of power plant device 108.

FIG. 4 is a flowchart illustrating a method for allowing a particular customer 102 access to website 125 in accordance with one embodiment of the present invention. The method illustrated in FIG. 4 outlines some of the functionality of validation tool 208. The method begins at step 400 where permission 214 for a respective customer 102 is stored in customer information database 122. Permission 214 has an associated user identification and a password for the respective customer 102. In response to a request by customer 102 to access website 125, web server 200 prompts customer 102 for their user identification and their password, as denoted by step 402.

Web server 200 receives the user identification and the password at step 404, and then validates the user identification and the password at step 406 by comparing them to permission 214 stored in customer information database 122. If either the user identification or the password is not validated at step 406, then an error message is sent to customer 102. However, if the user identification and the password are both validated at step 406, a home page 600 (FIG. 6) of website 125 is displayed at step 408. This ends the method outlined in FIG. 4.

Figure 5:
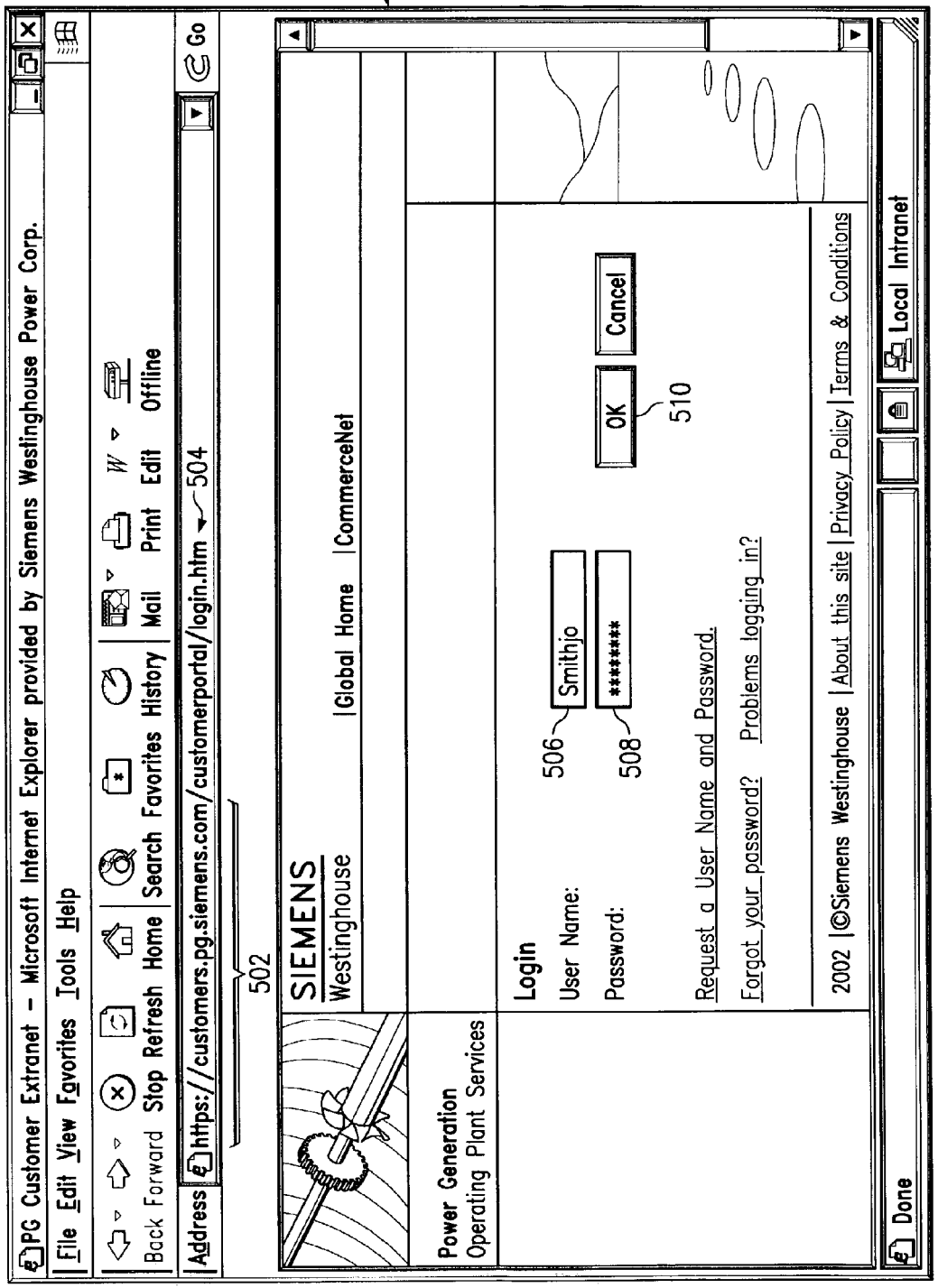
FIG. 5 is an exemplary login web page of a website in accordance with an embodiment of the present invention.

FIG. 5 illustrates an exemplary login web page 500 of website 125 in accordance with one embodiment of the present invention. Login web page 500 is stored in internal database 124 until customer 102 tries to logon to website 125. First, customer 102 enters a uniform resource locator ("URL") 502 in an address line 504 using their computer 112 to access login web page 500. Web server 200 transmits login web page 500 to computer 112 of customer 102 after customer 102 enters URL 502. Customer 102 is then prompted to enter that particular customer's 102 user identification and password. User name box 506 and a password box 508 are displayed on login web page 500 to allow customer 102 to enter their user identification and password. Customer 102 then clicks on an "OK" button 510 to send their user identification and password to web server 200. Web server 200 then receives the user identification and the password and validates them using permission 214 stored in customer information database 122. As described above in conjunction with FIG. 4, upon successful validation of the user identification and password, customer 102 is then allowed access to a home page 600 of website 125, as illustrated in FIG. 6.

Figure 6:
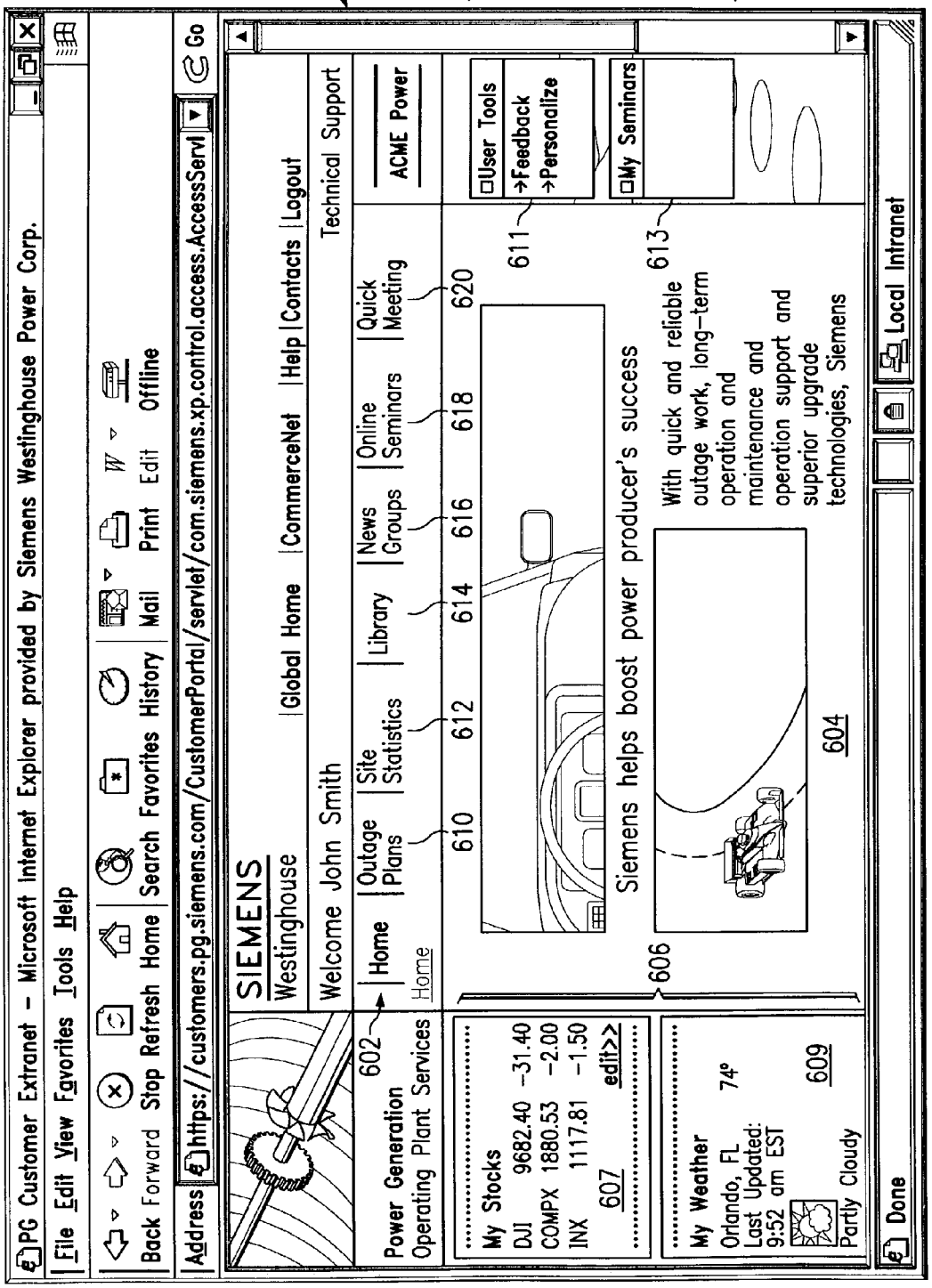
FIG. 6 is an exemplary home page of a website in accordance with an embodiment of the present invention.

FIG. 6 is an exemplary home page 600 of website 125 in accordance with an embodiment of the present invention. Home page 600 is generated by web page generation tool 211 and stored as a web page 216 on internal database 124 and transmitted to customer 102 after a successful login by customer 102. In the illustrated embodiment, home page 600 includes a links section 602, an advertising section 604, a customized section 606, and an interactive section 608. Home page 600 may have more sections, less sections, or different sections than those shown in FIG. 6.

Links section 602 includes a plurality of links that are each operable to display another web page 216 upon its selection by customer 102. In the illustrated embodiment, links section 602 includes an outage plans link 610, a site statistics link 612, a library link 614, a news groups link 616, an online seminars link 618, and a quick meeting link 620. A detailed description of what happens when each of these links is selected by customer 102 is outlined below in conjunction with FIGS. 7-12. Generally, outage plans link 610 is operable to display one or more outage plans for respective power plant devices 108 of customer 102, site statistics link 612 is operable to display one or more outputs containing information on respective power plant devices 108 of customer 102, library link 614 is operable to display a plurality of electronic files representing technical information related to power plant devices 108 that a customer 102 possesses, news groups link 616 is operable to facilitate communication between customer 102 and another entity, such as supplier 104 or another customer 102, online seminars link 618 is operable to facilitate the broadcasting of one or more seminars related to the power plant industry, and quick meeting link 620 is operable to facilitate videoconferencing between customer 102 and supplier 104 or between two or more customers 102.

Advertising section 604 functions as an advertising and/or marketing space for supplier 104. Any suitable advertising and/or marketing is contemplated by the present invention.

Customized section 606 functions to display information personalized for a particular customer 102. For example, as illustrated in FIG. 6, a stocks section 607 illustrates stock information and a weather section 609 illustrates the weather for the area that the particular customer 102 that is accessing website 125 is located. Any suitable personalized information of a particular customer 102 may be displayed on home page 600.

Interactive section 608 includes, in the illustrated embodiment, a user tools section 611 and a personal section 613. Any suitable sections for interactive section 608 are contemplated by the present invention. Generally, user tools section 611 may be used to give feedback to supplier 104 or may be used to personalize home page 600 based on a particular customer's 102 preferences. Personal section 613 may include important information on upcoming events that involves customer 102, such as a seminar that they have signed up for or a videoconference that will take place in the near future.

Home page 600 acts as sort of a "customer extranet portal" that allows customers 102 of supplier 104 access to a myriad of both technical and non-technical information. This improves customer relationships for supplier 104 by facilitating the efficient relay of relevant information to their customers 102. This leveraging of the Internet seeks to bring the power industry out of the stone age and into the digital age.

Figure 7:
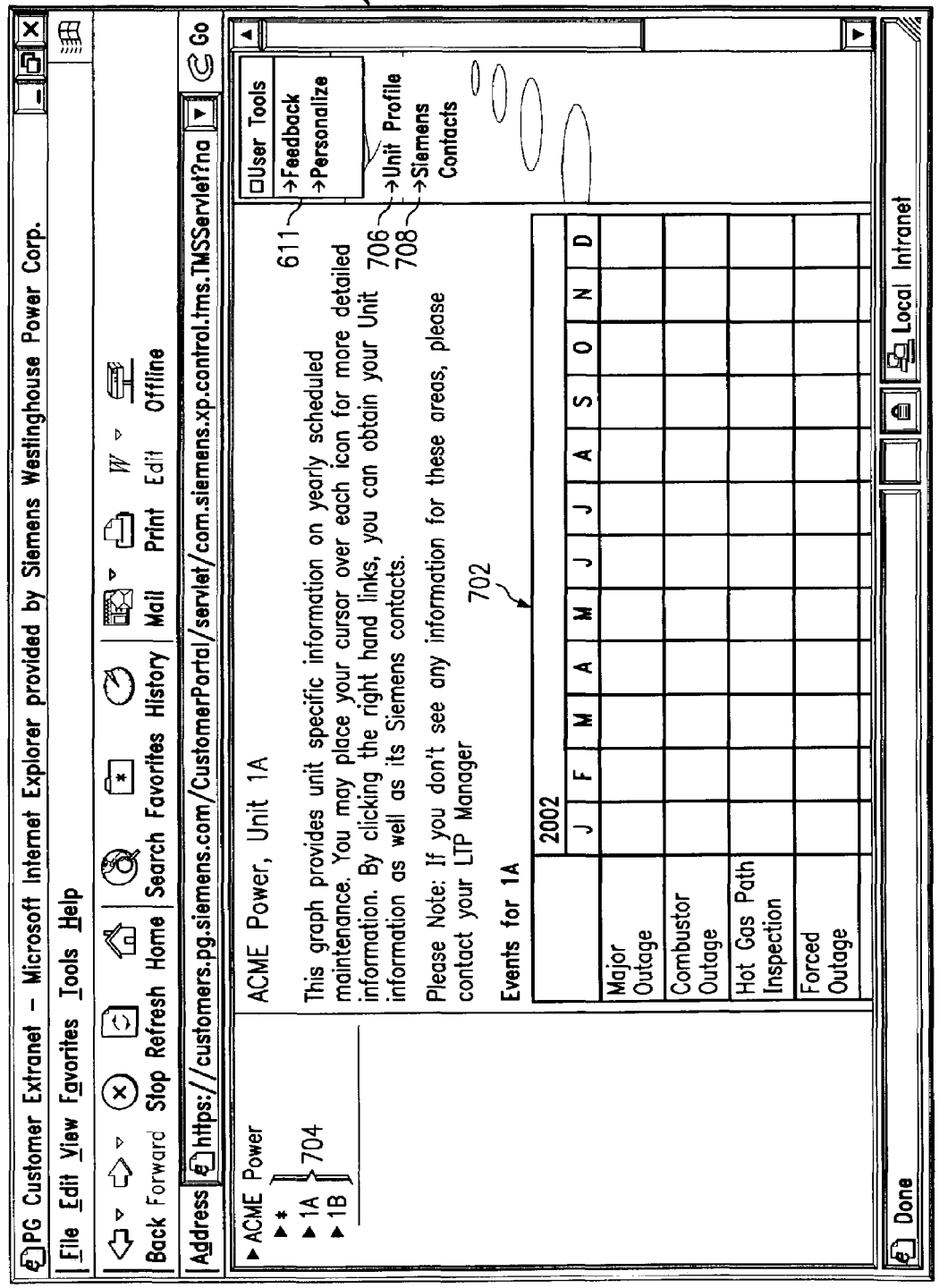
FIG. 7 is an exemplary outage plans web page of a website in accordance with an embodiment of the present invention.

FIG. 7 is an exemplary outage plans web page 700 of website 125 in accordance with an embodiment of the present invention. Outage plans web page 700 is transmitted to customer 102 upon customer 102's selection of outage plans link 610 on home page 600. Outage plans web page 700 displays one or more outage plans 702 for a respective power plant device 108 of customer 102. A plurality of links 704 on the left side of outage plans web page 700 allows customer 102 to select an outage plan 702 for a particular power plant device 108. On the right side of outage plans web page 700 is user tools section 611, a unit profiles link 706 and a Siemens contacts link 708. Unit profile link 706 allows customer 102 to obtain information on a particular power plant device 108 and Siemens contacts link 708 allows customer 108 to make contact, such as by e-mail, with an appropriate contact at supplier 104.

Outage plan 702 is illustrated in FIG. 7 in calendar form; however, any suitable form for outage plan 702 is contemplated by the present invention. Outage plan 702 is generated by any suitable computer program of supplier 104, such as web page generation tool 211. Outage plans 702, once generated, may be stored on internal database 124 as web pages 216. Information used to generate outage plan 702 may be obtained from any suitable source. For example, information may be entered by a user of client 120 or, in other embodiments, the information may come from customer 102. Having outage plans readily available to customers 102 is beneficial because they help customers 102 run their power plants more efficiently by being able to plan outages on a timely basis. In addition, utilizing website 125, and particularly outage plans web page 700, to convey outage plans to customers 102 allows the outage plans to be easily and quickly updated. Outages, shut-downs, maintenance, etc., for power plants and/or power plant devices 108 is important to extend the life of power plant devices 108 and to maintain or improve their efficiency.

Figure 8:
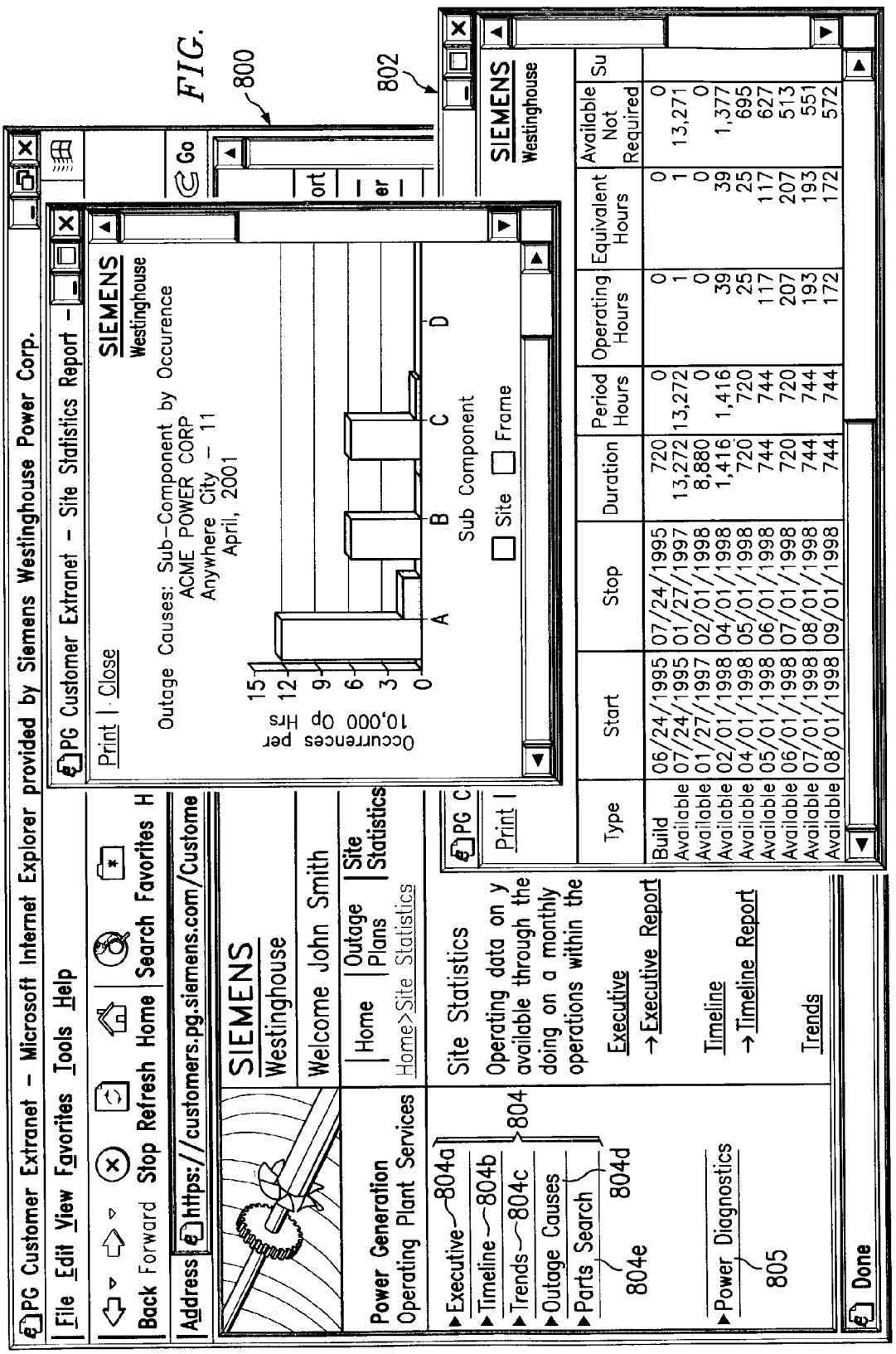
FIG. 8 is an exemplary site statistics web page of a website in accordance with an embodiment of the present invention.

FIG. 8 is an exemplary site statistics web page 800 of website 125 in accordance with an embodiment of the present invention. Site statistics web page 800 is transmitted to customer 102 upon customer 102's selection of site statistics link 612 on home page 600. Site statistics web page 800 is operable to display a plurality of outputs representative of a plurality of characteristics of power plant devices 108 of customer 102. As described above, the outputs may include a chart, a graph, a list, a table, or any other suitable output that is indicative of an operation of a particular power plant device 108.

For example, a timeline report 802 is illustrated in FIG. 8. This timeline report 802 illustrates, in the illustrated embodiment, the operational history of a combustion turbine including operating hours, number of starts, maintenance outage dates, and durations. Other suitable outputs may be displayed on site statistics web page 800. These are displayed when customer 102 selects one of a plurality of links 804 shown on the left hand side of site statistics web page 800. An Executive link 804a functions to provide high level operational summaries for executives of customer 102. Timeline link 804b functions to provide operational histories of a particular power plant device 108, such as a combustion turbine. A Trends link 804c functions to provide different variations of reports on the availability, reliability, and starting reliability for all power plant devices 108 owned by customer 102, a particular site location, or an individual power plant device 108. An Outage Causes link 804d functions to display one or more causes of an outage of a particular power plant device 108 of customer 102. Parts Search link 705e facilitates the searching, by customer 102, of one or more parts associated with one or more of their power plant devices 108. This gives the customer 102 the ability to view part lists and to order new parts for their power plant devices 108. Customer 102 may also be able to track parts ordered through parts search link 705e.

The outputs displayed by site statistics web page 800 are stored as web pages 216 in internal database 124. These web pages 216 may be files generated by processor 204 by utilizing site statistics processing tool 210. As described above in conjunction with FIG. 3, data representing a plurality of characteristics of the power plant 108 of customer 102 is automatically received by web server 200, the data is processed by processor 204 utilizing site statistics processing tool 210, and one or more outputs are generated and stored in internal database 124. An important technical advantage of one embodiment of the present invention is that data from customer 102 may be received and processed on a substantially real time basis. This enables supplier 104 to communicate important information to customer 102 about their power plant devices 108 on a timely basis, which may improve customer relationships. In addition, this effective communication about important equipment of customer 102 allows customer 102 to make informed decisions about their power plant devices 108 so that they may run smoothly and make customer 102 profitable by serving their customers better.

A power diagnostics link 805 may further facilitate a value added engineering function. Power diagnostics link 805 is operable to display diagnostic information related to the outputs displayed by site statistics web page 800. This diagnostic information is information provided by supplier 104 to customer 102 as a result of analyzing the processed data. Since supplier 104 is typically the original equipment manufacturer ("OEM"), then supplier 104 is in a better position to analyze and make sense out of the processed data. This information may be relayed to customer 102 as a web page 216. For example, this may include information regarding power plant devices possessed by other customers that are of the same or similar type as those possessed by customer 102 for comparison purposes. In other words, customer 102 may be able to see how the efficiency of a specific combustion turbine of theirs stacks up against an average efficiency of a fleet of the same type of combustion turbine. Any suitable diagnostic information is contemplated by the present invention, such as historical information related to power plant device 108 of customer 102 or projected information regarding the future operation of power plant device 108.

Figure 9:
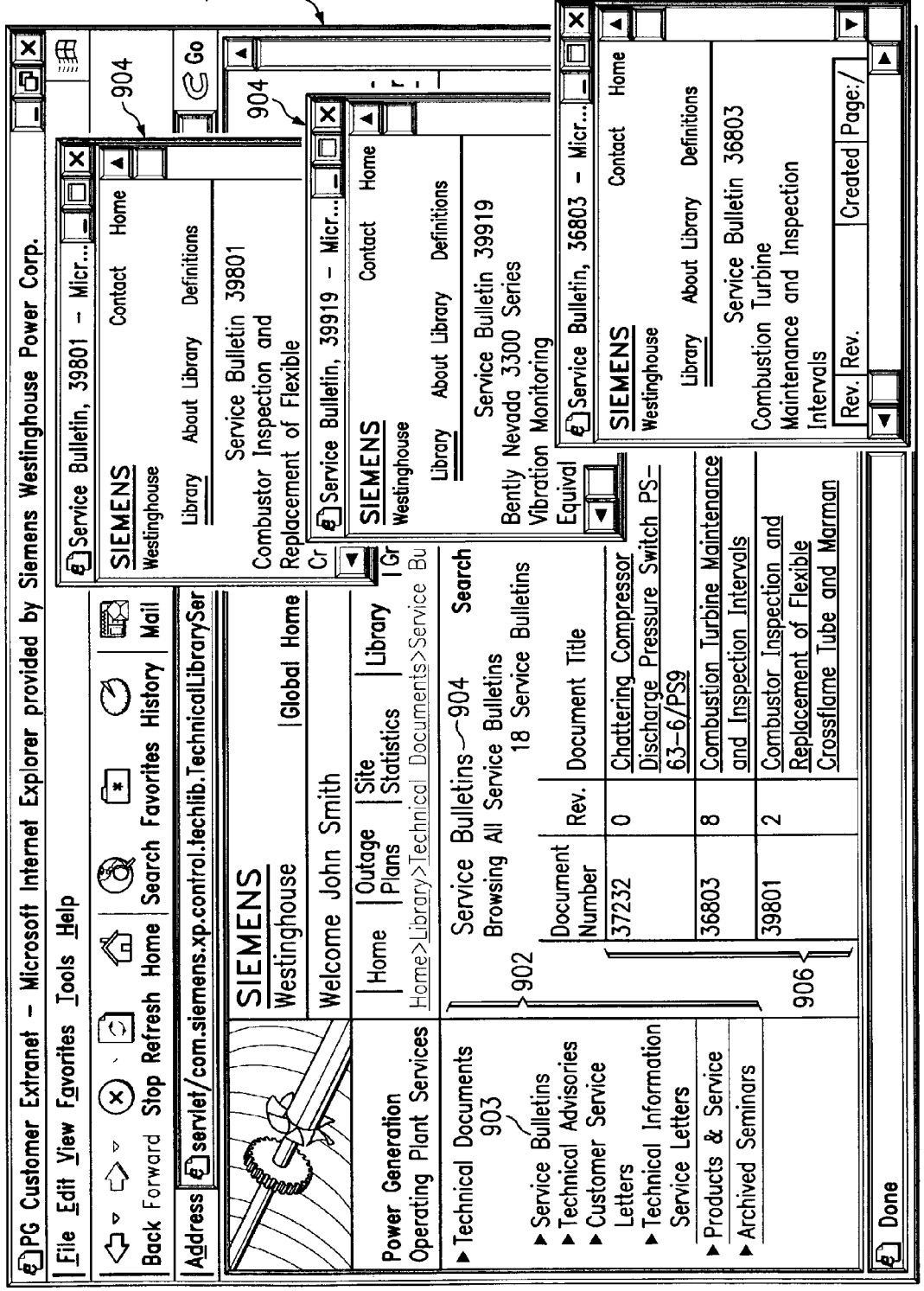
FIG. 9 is an exemplary library web page of a website in accordance with an embodiment of the present invention.

FIG. 9 is an exemplary library web page 900 of website 125 in accordance with an embodiment of the present invention. Library web page 900 is displayed when customer 102 selects library link 614 on home page 600. Library web page 900 is operable to display a plurality of electronic files representing technical information related to power plant devices 108 that customer 102 possesses as a plurality of links 902. Customer 102 may select any one of these links 902 to view the desired information. For example, customer 102 may select a Service Bulletins link 903 to display one or more service bulletins 904. Service bulletins 904 may list a plurality of electronic files 906 as links so that customer 102 may select the desired information.

Providing important technical information, such as service bulletins, allows customers 102 to maintain their power plant devices 108 so that they run effectively. Also, effective communication regarding important technical information related to the power plant industry in general and to customer's 102 power plant specifically, shows supplier's 104 commitment to providing good service to customer 102. Good service, along with quality products, is sure to lead to happy and profitable customers 102.

Figure 10:
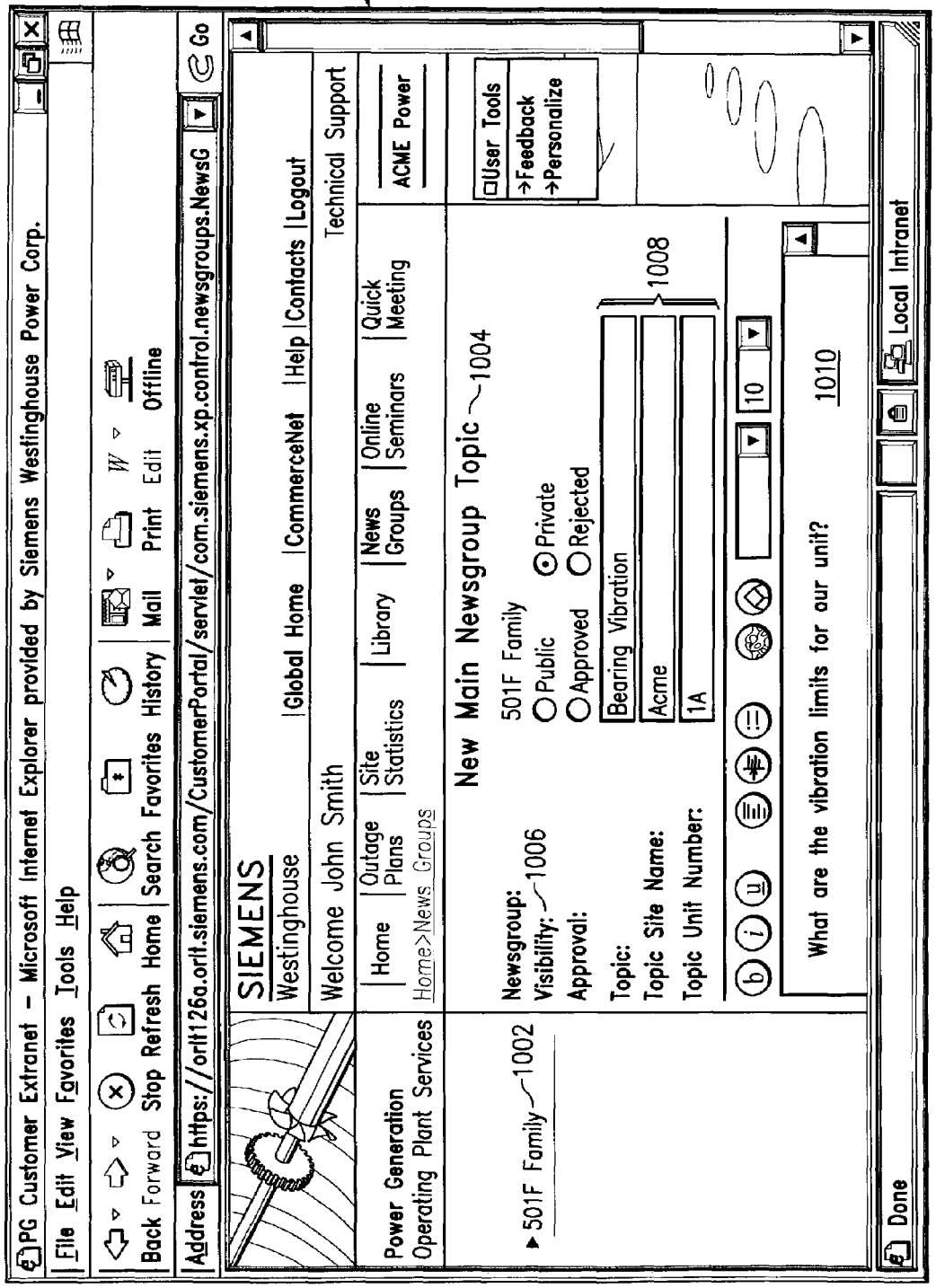
FIG. 10 is an exemplary new groups web page of a website in accordance with an embodiment of the present invention.

FIG. 10 is an exemplary news groups web page 1000 of website 125 in accordance with an embodiment of the present invention. News groups web page 1000 is displayed upon selection of news groups link 616 on home page 600. News groups web page 1000 is operable to facilitate communication between customer 102 and another entity, such as supplier 104 or one or more other customers 102. News groups web page 1000 includes one or more links 1002 that allow customer 102 to select a particular power plant device or devices 108 that they wish to communicate about. Upon selection of a particular link 1002, a news group section 1004 is displayed.

In the illustrated embodiment, news group section 1004 includes a visibility option 1006, which allows customer 102 to check either a public or a private button. If the private button is selected (as shown) then the communication is only seen by customer 102 and supplier 104. However, if the public button is selected, then all customers 102 accessing website 125 and selecting the news group link 616 may have the ability to see the communication. News group section 1004 may also include a topic section 1008 that contains any suitable information about the communication topic. News group section 1004 also includes a communication section 1010, which functions to display the communication between appropriate entities.

News groups web page 1000 promotes good communication between supplier 104 and customer 102 or between customers 102, which shows supplier's 104 commitment to good service. Having visibility option 1006 gives a particular customer 102 an option of restricting access to a particular topic that may be sensitive, or opening up a forum discussion about a particular topic that may be important to all customers 102 in the power plant industry that has received power plant devices 108 from supplier 104. This latter option illustrates supplier's 104 concern about their customers' well being.

Figure 11:
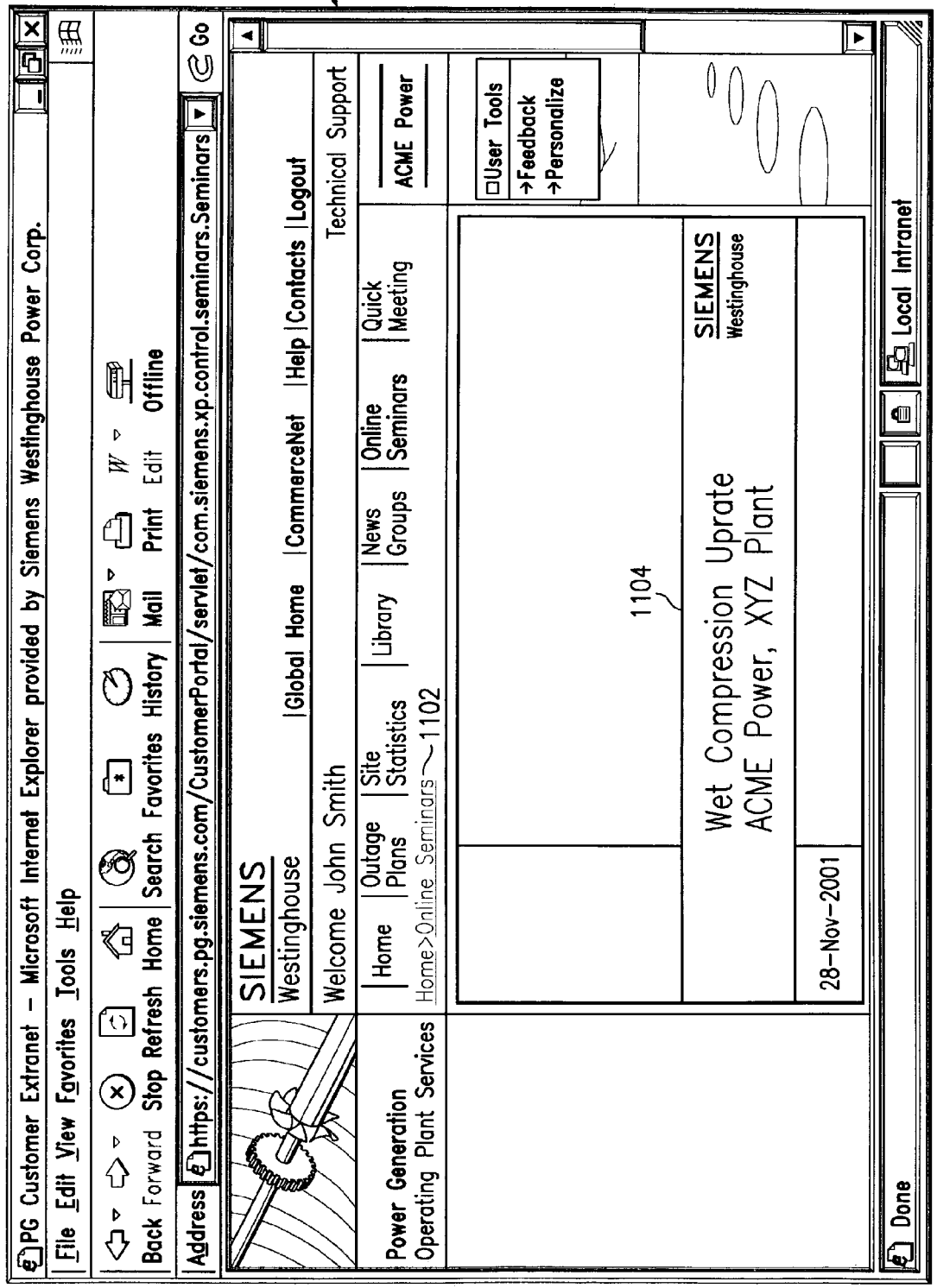
FIG. 11 is an exemplary online seminar web page of a website in accordance with an embodiment of the present invention.

FIG. 11 is an exemplary online seminars web page 1100 of website 125 in accordance with an embodiment of the present invention. Online seminars web page 1100 is displayed when customer 102 selects online seminars link 618 on home page 600. Online seminars web page 1100 is operable to facilitate the broadcasting of a seminar related to the power plant industry. Online seminars web page 1100 includes an online seminars link 1102 that is operable to display one or more online seminars related to the power plant industry that are available for viewing by customer 102. For example, a "Wet Compression Uprate" seminar 1104 is displayed on online seminars web page 1100. Customers 102 that sign up for this seminar 1104 may view this seminar via their computer 112 when broadcast at the appropriate time. In addition, online seminars web page 1100 may also operate to give customer 102 the ability to download PowerPoint presentations relating to the power plant industry.

Seminars or PowerPoint presentations may be generated in any suitable manner, such as by user's of clients 120. Making these types of information available to customers 102 may help supplier 104 look good in the eyes of customers 102, which may lead to new business.

Figure 12:
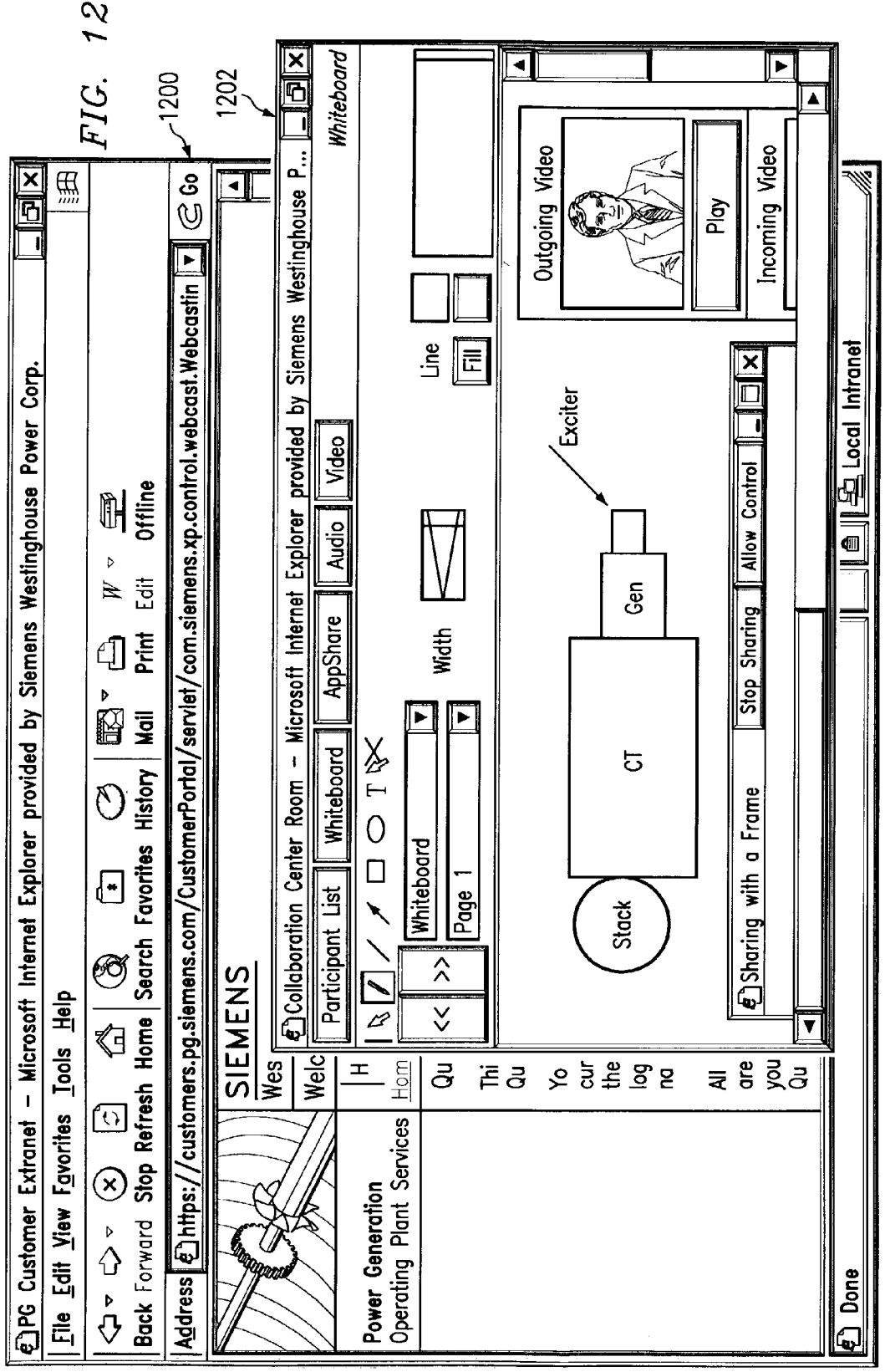
FIG. 12 is an exemplary quick meeting web page of a website in accordance with an embodiment of the present invention.

FIG. 12 is an exemplary quick meeting web page 1200 of website 125 in accordance with an embodiment of the present invention. Quick meeting web page 1200 is displayed when customer 102 selects quick meeting link 620 on home page 600. Quick meeting web page 1200 is operable to facilitate a videoconference between customer 102 and supplier 104. In one embodiment, this videoconferencing is hosted by web server 200; however, the present invention contemplates other hosts for the videoconferencing. The videoconferencing may have any suitable functionality, such as white boards, share applications, or other suitable functions. For example, as illustrated in FIG. 12, a white board 1202 is illustrated on the screen, in which two people are discussing a particular power plant device 108. Similar to news groups web page 1000, quick meeting web page 1200 promotes good communication between supplier 104 and customer 102, which shows supplier's 104 commitment to good service.

The present invention contemplates more, less, or other web pages 216 associated with website 125 of supplier 104. However, the web pages described above illustrate many functions that allow good, effective communication between supplier 104 and customers 102 in the power industry. These allow supplier 104 to help their customers 102 become profitable and sustain profitability by providing value added engineering through analysis of received data. In addition, supplier 104 may show their customers 102 that they care about their business and bottom line and are willing to go out of their way to help their customers 102 become successful. This is called good service, and is a good way to not only stay in the power plant industry, but to be successful in the power plant industry.

Although embodiments of the invention and their advantages are described in detail, a person skilled in the art could make various alterations, additions, and omissions without departing from the spirit and scope of the present invention as defined by the appended claims.

What is claimed is:

1. A computerized method of providing information to a customer in the power industry, comprising:

automatically receiving, for each of a plurality of independent customers, data representing a plurality of characteristics of a power plant device associated with a power plant of a respective independent customer based on monitoring of the power plant device, the data received at a location remote from the power plant; wherein the data is automatically generated by one or more data collection devices monitoring the plurality of characteristics of the power plant device and is automatically sent to the remote location for use in diagnosing an operating condition of the power plant device;

processing the data;

generating one or more outputs representative of the processed data;

displaying, by a web page of a website, at least one of the outputs in response to a request by one of the plurality of independent customers;

displaying, by the web page, diagnostic information related to the displayed output;

further comprising:

displaying a home page of the website;

displaying a plurality of links on the homepage, wherein displaying a plurality of links on the homepage comprises:

displaying an outage plans link comprising scheduled maintenance activities to be performed during the outage;

displaying, in response to a selection of the outage plans link by the one independent customer, an outage plan for a respective power plant device as a link on a outage plans web page;

displaying the outage plan in response to a request by the one independent customer;

wherein the power plant device is of a certain type; and wherein displaying diagnostic information related to the displayed output comprises displaying averaged information related to power plant devices of the certain type that are possessed by some of the other independent customers.

2. The computerized method of claim 1, further comprising:

storing a permission for each independent customer, the permission having a user identification and a password associated with each independent customer;

prompting a respective independent customer, in response to a request by the respective independent customer to access the website, for the user identification and the password;

receiving the user identification and the password; and validating the user identification and the password via the permission.

3. The computerized method of claim 1, wherein displaying a plurality of links on the homepage comprises:

displaying a site statistics link;

displaying, in response to a selection of the site statistics link by the one independent customer, a plurality of outputs as links on a site statistics web page; and displaying one of the outputs in response to the request by the one independent customer.

4. The computerized method of claim 1, wherein displaying a plurality of links on the homepage comprises:

displaying a news groups link; and facilitating, in response to a selection of the news groups link by a respective customer, communication between the respective customer and an entity selected from the group consisting of a host of the website and another respective customer.

5. The computerized method of claim 1, wherein the one or more outputs are selected from the group consisting of a chart, a graph, a list, and a table, and wherein the one or more outputs are indicative of an operation of the power plant device.

6. The computerized method of claim 1, wherein displaying diagnostic information related to the displayed output comprises displaying historical information related to the power plant device.

7. A computerized method of providing information to a customer in the power industry, comprising:

automatically receiving data representing a plurality of characteristics of a power plant device associated with a power plant of the customer based on monitoring of the power plant device, the data received at a location remote from the power plant, wherein the data is automatically generated by one or more data collection devices monitoring a plurality of characteristics of the power plant device and is automatically sent to the remote location for use in diagnosing an operating condition of the power plant device;

processing the data;

generating one or more outputs representative of the processed data;

displaying, by a web page of a website, at least one of the outputs in response to a request by the customer;

displaying, by the web page, diagnostic information related to the displayed output;

wherein the power plant device is of a certain type, wherein displaying diagnostic information related to the displayed output comprises displaying averaged information related to power plant devices of the certain type that are possessed by other customers;

displaying a home page of the website;

displaying an outage plans link on the homepage comprising scheduled maintenance activities to be performed during the outage;

displaying, in response to a selection of the outage plans link by the customer, an outage plan for a respective power plant device as a link on a outage plans web page; and displaying the outage plan in response to a request by the customer.

8. The computerized method of claim 7, further comprising:

storing a permission for the customer, the permission having a user identification and a password for the customer; prompting the customer, in response to a request by the customer to access the website, for the user identification and the password;

receiving the user identification and the password; and validating the user identification and the password via the permission.

9. The computerized method of claim 7, further comprising:

displaying a site statistics link on the home page;

displaying, in response to a selection of the site statistics link by the customer, a plurality of outputs as links on a site statistics web page; and displaying one of the outputs in response to the request by the customer.

10. The computerized method of claim 7, further comprising:

displaying a library link on the home page; displaying, in response to a selection of the library link by the customer, a plurality of electronic files representing technical information related to the power plant devices that the customer possesses as a link on a library web page; and displaying one of the electronic files in response to a request by the customer.

11. The computerized method of claim 7, further comprising:

displaying a news groups link on the home page; and facilitating, in response to a selection of the news groups link by the customer, communication between the customer and an entity selected from the group consisting of a host of the website and another customer.

12. The computerized method of claim 7, further comprising:

displaying an online seminars link on the home page; and broadcasting, in response to a selection of the online seminars link by the customer, a seminar related to the power plant industry.

13. The computerized method of claim 7, further comprising:

displaying a quick meeting link on the home page; and facilitating, in response to a selection of the quick meeting link by the customer videoconferencing with the customer.

14. The computerized method of claim 7, further comprising displaying advertising on at least one web page of the website, the advertising customized for the customer.

15. The computerized method of claim 7, wherein the power plant device is selected from the group consisting of a turbine, a compressor, a generator, a boiler, a pump, a valve, and a bearing.

16. The computerized method of claim 7, wherein one of the plurality of characteristics is selected from the group consisting of pressure, temperature, time, position, speed, quality, vibration, and current output.

17. The computerized method of claim 7, wherein the automatically receiving step comprises automatically receiving over a communications network data representing a plurality of characteristics of a power plant device of the customer based on automatic sensing of the characteristics.

18. The computerized method of claim 7, wherein the automatically receiving step comprises:

receiving data representing a plurality of characteristics of a power plant device of the customer; and entering the data in a computer.

19. The computerized method of claim 7, wherein the one or more outputs are selected from the group consisting of a chart, a graph, a list, and a table, and wherein the one or more outputs are indicative of an operation of the power plant device.

20. The computerized method of claim 7, wherein displaying diagnostic information related to the displayed output comprises displaying historical information related to the power plant device.

* * * * *